Reissued Apr. 7, 1936

Re. 19,919

UNITED STATES PATENT OFFICE 19,919

COMPOSITION MATERIAL

Paul Bechtner, Chicago, Ill., assignor to American Colloid Company, Lead, S. Dak., a corporation of South Dakota No Drawing. Original No. 1,830,253, dated November 3, 1931, Serial No. 506,508, January 3, 1931. Application for reissue May 28, 1935, Serial No. 23,955

22 Claims. (Cl. 106—18)

The present invention relates to a composite material and more particularly to a composite material that can be formed into a body that has low conductivity of heat and sound, is fire-resisting and vermin-proof, and is light in weight.

One of the objects of the present invention is to provide a material which may be produced at low cost and may be formed into a body comparatively light in weight, rigid and durable, fire-resisting and vermin-proof, and of low conductivity for heat and sound, which is adapted for use in refrigerators, cold storage plants, furnaces, around pipes, hot-water tanks, boilers, under floors, roofs, and in and on walls and the like.

Another object of the present invention is to provide a dry mixture of bentonite and vermiculite, which upon the addition of water at the place of use may be formed into articles, such as slabs, tile, etc., or plastered on walls and ceilings, and which upon air-drying will set to form a new and improved insulating and acoustic material.

A further object of the present invention is to provide an insulating material and acoustic which may be plastered upon walls and ceilings and when air-dried will adhere strongly without the addition of organic binders.

This composite material has for its chief ingredients bentonite and heat-treated vermiculite, which is a form of mica that expands greatly on heating, forming light spongy masses that withstand high temperatures. Vermiculite is also known as jefferisite, and is sometimes sold under the trade-name of Zonolite.

The bentonite used may be the ordinary comminuted bentonite of commerce, or there may be added to ordinary comminuted bentonite ¾% up to 1½% of magnesium oxide or caustic calcined magnesite which improves the gel-forming properties of bentonite when wet.

The vermiculite is heated to expel its water of crystallization and to expand it, and it is then comminuted and screened, or air-separated, or may be used as it comes from the furnace.

It has been found that a desirable size of expanded vermiculite for use in the present composition is that which has been screened to remove particles finer than 20 mesh and coarser than 6 mesh. However, coarser or finer particles may be used with good results.

The bentonite and vermiculite are mixed dry, water is then added in sufficient quantity to make a workable sticky mass, which is then formed into slabs, tile, etc., or applied to a surface and air-dried. When air-dried, its weight is 26 to 28 pounds per cubic foot.

The addition of caustic uncalcined magnesite or magnesium oxide to the bentonite-vermiculite mixture improves the stickiness and workability of the composition.

It was also found to be advantageous to add mineral fibers, such as, asbestos and mineral wool.

Asbestos may be added to either of the above mixtures and improves the strength of the composition.

It has also been found very advantageous to add mineral wool to the mixture, since this ingredient also increases the strength of the material.

Mineral coloring matter may be added to the mixture for decorative purposes, or it may be painted, or stained, after drying.

Without desiring to restrict myself to the proportions named I will now give four examples of the mixtures for forming the composition which will exhibit the advantages of my invention:

| | Mixture No. 1 | Mixture No. 2 | Mixture No. 3 | Mixture No. 4 |
|---|---|---|---|---|
| Comminuted bentonite | 32 | 32 | 32 | 32 |
| Expanded vermiculite | 68 | 68 | 46 | 46 |
| Mineral wool | | | 22 | 15 |
| Asbestos | | | | 7 |
| Magnesium oxide or caustic calcined magnesite | | 0.3 | 0.3 | 0.3 |
| Water | 150 | 150 | 150 | 150 |

The mixture may be made up in dry form and shipped to the point of use where a sufficient quantity of water may be added and immediately applied by a plasterer.

Dry solid bentonite is a heavy substance. When mixed with all the water it will absorb, it swells 12 to 15 times its dry bulk. On drying it shrinks greatly, but does not regain all its original solidity; hence is lighter, and the air pores thus formed contribute to its sound and heat insulating properties. Used alone, these effects are too slight to be of commercial value, but when mixed wet with mineral wool or heat-treated vermiculite or both, the pore-forming properties of the resulting dried body are intensified.

My composition has to be wetted to make it sticky and when wetted it adheres strongly to plaster walls, glass, metal (hot or cold), enameled surfaces and wood as it dries and after drying. This adhesive property is one of the chief reasons for its economy and ease of application, and is attained without the use of an organic adhesive.

My composition may be painted to render the surface to some extent waterproof, or it may be coated with waterproof bitumens as is done with the insulating blocks used in refrigerators.

My composition has sufficient elasticity to absorb the expansion and contraction of the surface to which it is attached without cracking.

The bright gold color of the vermiculite imparts a pleasing and unusual decorative effect. A coat of light varnish may be applied to improve surface adhesion and keep the color bright.

Having thus described my invention, what I claim and desire to secure by Letters Patent of the United States:—

1. A composite material comprising a rigid mass comprising heat-treated vermiculite, bentonite, mineral wool, and water.

2. A composite material comprising a rigid mass comprising heat-treated vermiculite, bentonite, asbestos, and water.

3. A composite material comprising a rigid mass comprising heat-treated vermiculite, bentonite, asbestos, mineral wool, and water.

4. A composite material comprising a rigid mass comprising comminuted heat-treated vermiculite, bentonite, water and magnesium oxide.

5. A composite material comprising a rigid mass comprising heat-treated vermiculite, bentonite, mineral wool, water, and caustic calcined magnesite.

6. A composite material comprising a rigid mass comprising heat-treated vermiculite, bentonite, asbestos, water and caustic calcined magnesite.

7. A composite material comprising a rigid mass comprising heat-treated vermiculite, bentonite, asbestos, mineral wool, water and caustic calcined magnesite.

8. A composite material comprising a rigid mass comprising expanded vermiculite 68 parts, bentonite 32 parts, and water 150 parts.

9. The process of providing surfaces with a coating of light-weight heat insulating cement or plaster which comprises mixing together particles of expanded vermiculite, bentonite, and water to form a workable, sticky or adherent mass, plastering the mixture on to the surface to be coated, and thereafter drying the plaster to a rigid or solid consistency.

10. The process of providing surfaces with a coating of light-weight heat insulating cement or plaster which comprises mixing together particles of expanded vermiculite, bentonite, mineral fibers, and water to form a workable, sticky or adherent mass, plastering the mixture onto the surface to be coated, and thereafter drying the plaster to a rigid or solid consistency.

11. The process of providing surfaces with a coating of light-weight heat insulating cement or plaster which comprises mixing together particles of expanded vermiculite, bentonite, asbestos fibers, and water to form a workable, sticky or adherent mass, plastering the mixture on the surface to be coated and thereafter drying the plaster to a rigid or solid consistency.

12. The process of providing surfaces with a coating light-weight heat insulating cement or plaster which comprises mixing together particles of expanded vermiculite, bentonite, mineral fibers, said fibers amounting by weight from about 7% to about 22% of the solid constituents of the mixture, and water to form a workable, sticky or adherent mass, plastering the mixture onto the surface to be coated, and thereafter drying the plaster to a rigid or solid consistency.

13. The process of providing surfaces with a coating of light-weight heat insulating cement or plaster which comprises mixing together particles of expanded vermiculite in quantity amounting from about 46% to about 68% of the solid constituents of the mixture, bentonite, mineral fibers, and water to form a workable, sticky or adherent mass, plastering the mixture onto the surface to be coated, and thereafter drying the plaster to a rigid or solid consistency.

14. The process of providing surfaces with a coating of light-weight heat insulating cement or plaster which comprises mixing together particles of expanded vermiculite in quantity amounting from about 46% to about 68% of the solid constituents of the mixture, bentonite, mineral fibers, said fibers amounting by weight from about 7% to about 22% of the solid constituents of the mixture, and water to form a workable, sticky or adherent mass, plastering the mixture onto the surface to be coated, and thereafter drying the plaster to a rigid or solid consistency.

15. The process of providing surfaces with a coating of light-weight heat insulating cement or plaster which comprises mixing together particles of expanded vermiculite, bentonite, and water to form a workable, sticky or adherent mass, plastering the mixture onto the surface to be coated, thereafter drying the plaster to a rigid or solid consistency, and waterproofing the dried coating by applying a coating of waterproofing material thereon.

16. A heat insulating plaster composition characterized by its light weight and strong adherence to the treated surface comprising a mixture of particles of expanded vermiculite, bentonite, and water proportioned to produce a workable, sticky or adherent mass, said composition upon drying being of a rigid or solid consistency and permanently adherent to the treated surface.

17. A heat insulating plaster composition characterized by its light weight and strong adherence to the treated surface comprising a mixture of particles of expanded vermiculite, bentonite, mineral fibers, and water proportioned to produce a workable, sticky or adherent mass, said composition upon drying being of a rigid or solid consistency and permanently adherent to the treated surface.

18. A heat insulating plaster composition characterized by its light weight and strong adherence to the treated surface comprising a mixture of particles of expanded vermiculite, bentonite, asbestos fibers, and water proportioned to produce a workable, sticky or adherent mass, said composition upon drying being of a rigid or solid consistency and permanently adherent to the treated surface.

19. A heat insulating plaster composition characterized by its light weight and strong adherence to the treated surface comprising a mixture of particles of expanded vermiculite, bentonite, mineral fibers, said fibers amounting by weight from about 7% to about 22% of the solid constituents of the mixture, and water proportioned to produce a workable, sticky or adherent mass, said composition upon drying being of a rigid or solid consistency and permanently adherent to the treated surface.

20. A heat insulating plaster composition characterized by its light weight and strong adherence to the treated surface comprising a mixture of particles of expanded vermiculite in quantity amounting from about 46% to about 68% of the solid constituents of the mixture, bentonite, mineral fibers, and water proportioned to produce a workable, sticky or adherent mass, said composition upon drying being of a rigid or solid consistency and permanently adherent to the treated surface.

21. A heat insulating plaster composition characterized by its light weight and strong adherence to the treated surface comprising a mixture of particles of expanded vermiculite in quantity amounting from about 46% to about 68% of the solid constituents of the mixture, bentonite, mineral fibers, said fibers amounting by weight from about 7% to about 22% of the solid constituents of the mixture, and water proportioned to produce a workable, sticky or adherent mass, said composition upon drying being of a rigid or solid consistency and permanently adherent to the treated surface.

22. A heat insulating plaster composition characterized by its light weight and strong adherence to the treated surface comprising a mixture of about 46 parts to about 68 parts of particles of expanded vermiculite, about 7 parts to about 22 parts of mineral fibers, the residue being water and bentonite in sufficient quantities to produce a workable, sticky or adherent mass, said composition upon drying being of a rigid or solid consistency and permanently adherent to the treated surface.

PAUL BECHTNER.